United States Patent
Tadano et al.

(10) Patent No.: US 12,019,455 B2
(45) Date of Patent: Jun. 25, 2024

(54) TRANSPORT OPERATION CONTROL DEVICE, TRANSPORT SYSTEM, TRANSPORT OPERATION CONTROL METHOD, AND RECORDING MEDIUM

(71) Applicant: NEC Corporation, Tokyo (JP)

(72) Inventors: Kumiko Tadano, Tokyo (JP); Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1009 days.

(21) Appl. No.: 16/963,699

(22) PCT Filed: Feb. 8, 2018

(86) PCT No.: PCT/JP2018/004482
§ 371 (c)(1),
(2) Date: Jul. 21, 2020

(87) PCT Pub. No.: WO2019/155589
PCT Pub. Date: Aug. 15, 2019

(65) Prior Publication Data
US 2021/0080976 A1    Mar. 18, 2021

(51) Int. Cl.
*G05B 19/418*    (2006.01)
*G01C 21/34*    (2006.01)
(Continued)

(52) U.S. Cl.
CPC ....... *G05D 1/0297* (2013.01); *G01C 21/3407* (2013.01); *G05B 19/418* (2013.01);
(Continued)

(58) Field of Classification Search
CPC ......... G05D 1/0297; G05D 2201/0216; G01C 21/3407; G05B 19/418;
(Continued)

(56) References Cited

U.S. PATENT DOCUMENTS

2001/0047237 A1* 11/2001 Nakagawa ............. G08G 1/202
701/533
2006/0271252 A1   11/2006 Hori et al.
(Continued)

FOREIGN PATENT DOCUMENTS

CN    101894311 A     11/2010
CN    105930862 A  *  9/2016
(Continued)

OTHER PUBLICATIONS

Chinese Office Action for CN Application No. 201880088926.7, dated Feb. 16, 2023 with English Translation.
(Continued)

*Primary Examiner* — Vivek D Koppikar
*Assistant Examiner* — Jeffrey R Chalhoub
(74) *Attorney, Agent, or Firm* — Sughrue Mion, PLLC

(57) ABSTRACT

The present invention increases the productivity of an entire factory, even of the type that produces different types of products in different quantities using transport vehicles, by performing transport operation control. This transport operation control device is provided with: a spatial distribution measuring unit which measures the spatial distribution of products-in-process being transported by the transport vehicles; and an operation schedule calculation unit which, on the basis of the measured spatial distribution of the group of partly-finished products, calculates an operation schedule that specifies both a route and a frequency of a transport operation to be carried out by each transport vehicle of the transport vehicles, wherein the operation schedule calculation unit determines the timing with which to update the operation schedule, on the basis of changes in a productivity index that is determined from the measured spatial distribution of the products-in-process.

18 Claims, 9 Drawing Sheets

(51) Int. Cl.
*G05D 1/00* (2006.01)
*B65G 1/137* (2006.01)
*H04L 67/12* (2022.01)

(52) U.S. Cl.
CPC .. *B65G 1/1373* (2013.01); *G05B 2219/31001* (2013.01); *G05B 2219/31281* (2013.01); *H04L 67/12* (2013.01)

(58) Field of Classification Search
CPC .......... G05B 2219/31001; G05B 2219/31281; B65G 1/1373; H04L 67/12
See application file for complete search history.

(56) References Cited

U.S. PATENT DOCUMENTS

| | | | |
|---|---|---|---|
| 2011/0071955 A1 | 3/2011 | Nakamura et al. | |
| 2014/0018955 A1 | 1/2014 | Asakawa et al. | |
| 2016/0246301 A1* | 8/2016 | Kazama | G05D 1/0212 |
| 2018/0150067 A1 | 5/2018 | An et al. | |

FOREIGN PATENT DOCUMENTS

| | | |
|---|---|---|
| CN | 106651231 A | 5/2017 |
| CN | 106774196 A | 5/2017 |
| CN | 107657364 A | 2/2018 |
| JP | H08-113344 A | 5/1996 |
| JP | 2562519 B2 | 12/1996 |
| JP | 2002-114330 A | 4/2002 |
| JP | 2006-331053 A | 12/2006 |
| JP | 2012-056667 A | 3/2012 |
| JP | 2013-014387 A | 1/2013 |
| JP | 2014-149766 A | 8/2014 |
| WO | 2012/121378 A1 | 9/2012 |

OTHER PUBLICATIONS

International Search Report for PCT Application No. PCT/JP2018/004482, dated Apr. 24, 2018.

English translation of Written opinion for PCT Application No. PCT/JP2018/004482, dated Apr. 24, 2018.

* cited by examiner

TRANSPORT OPERATION CONTROL DEVICE, TRANSPORT SYSTEM, TRANSPORT OPERATION CONTROL METHOD, AND RECORDING MEDIUM

This application is a National Stage Entry of PCT/JP2018/004482 filed on Feb. 8, 2018, the contents of all of which are incorporated herein by reference, in their entirety.

TECHNICAL FIELD

This invention relates to a transport operation control device for deriving a traveling route of one or a plurality of transport vehicles, a transport operation control method, a transport operation control program, and a recording medium recording the transport operation control program.

BACKGROUND ART

In recent years, shortage of manpower in fields of manufacture and logistics is growing into a serious problem. On the other hand, with diversification of customers' needs, multiproduct variable-quantity type factories and multiproduct-adaptive warehouses (hereinafter will collectively be called "multiproduct variable-quantity type factories" for brevity) are increasing.

Generally, in multiproduct variable-quantity type factories, demand forecasting is difficult, and types and quantities of products to be handled are changing frequently. Therefore, due to factors such as unexpected load variation, setup change, inexperienced work, variation in time of completion of production or completion of transportation tends to become large. Thus, in such multiproduct variable-quantity type factories, operation status changes with high frequency on a routine basis.

In conveyance of products-in-process, parts, products (hereinafter will collectively be called "products-in-process" for brevity) between processes in factories and warehouses, various techniques are used to prepare an efficient transport plan on the basis of static information such as a preliminarily planned production quantity.

For example, Patent Literatures 1 and 2 describe transport plan preparation devices and transport systems. Patent Literature 1 describes the technique of generating a transport plan with reference to transport cost (energy and manpower) to reduce the transport cost (energy and manpower). Patent Literature 2 describes the technique of generating a transport plan (running route of each transport vehicle) capable of avoiding congestion with reference to a distribution of transport vehicles.

As one example of a transport operation control technique widely used for many years, there is a technique of making a transport vehicle or a transport worker (hereinafter will collectively be called "transport vehicle" for brevity) circulate along a fixed route including one or more predetermined workstations in a fixed (regular) period on the basis of the static information such as the preliminarily planned production quantity (hereinafter will be called "regular-period fixed route" for brevity). The workstation is a place to handle one or a plurality of processes and, as illustrated in FIG. 1 for example, may comprise an input buffer for storing a large number of products-in-process to be processed, processing units for production, inspection, and packaging, and an output buffer for storing the products-in-process already processed and ready to be transported.

As an advantage of the transport operation control technique using the regular-period fixed route, the technique is easy for people to understand, and operation and response upon occurrence of abnormal situations are easy.

PRIOR ART LITERATURE(S)

Patent Literature(s)

Patent Literature 1: JP 2012-056667 A
Patent Literature 2: JP 2006-331053 A
Patent Literature 3: JP 2562519 B
Patent Literature 4: WO2012/121378

SUMMARY OF THE INVENTION

Problem to be Solved by the Invention

Following recent increase in relative weight of the multiproduct variable-quantity type factories, there is an increasing demand for more flexible transport operation control techniques. The transport plan preparation devices and the transport systems described in Patent Literatures 1 and 2 lack flexibility in selection of a circulation route or a circulating frequency in response to variation in type or quantity of a large number of products because the regular-period fixed route is employed. For example, the mechanisms described in Patent Literatures 1 and 2 cannot determine the circulating frequency corresponding to a transport load.

As examples of transport control techniques improved in flexibility as compared with the circulation using the regular-period fixed route, there are techniques described in Patent Literatures 3 and 4.

According to the technique described in Patent Literature 3, a line control system including transport control automatically carries out re-scheduling on the supposition that a facility at which an error has occurred during operation no longer exists. In the method of controlling an automatic guided vehicle described in Patent Literature 3, products are supplied in supply orders according to schedules respectively determined in facilities and the facilities can be efficiently operated even upon occurrence of each gap in processing time.

The technique described in Patent Literature 4 is a technique of improving production efficiency by estimating a workpiece processing finish time in a processing device and speculatively moving a transport device.

However, in the multiproduct variable-quantity type factories where operation status changes with high frequency on a routine basis, the technique described in Patent Literature 3 is inefficient because re-scheduling is frequently required.

On the other hand, the technique described in Patent Literature 4 is not related to the transportation using the regular-period fixed route. Particularly in case where the transportation using the regular-period fixed route is carried out in an existing factory required to achieve a high product quality, application of the technique is often difficult because such a change in basic operation mode affects quality control.

Many factories often adapt to a change in product type by re-construction of a production line although a completely new production line may sometimes be constructed. In existing factories, there is a demand for improving the transport operation control technique using the regular-period fixed route, which has achieved abundant operational performance for many years, so as to adapt to a multiproduct variable-quantity type factory system.

In view of the above-mentioned matters, this invention provides a transport operation control device, a transport system, a transport operation control method, and a recording medium, which are capable of increasing productivity in an entire factory by transport operation control of efficiently transporting a large number of products-in-process via inter-workstation networks, even in a multiproduct variable-quantity type factory using transport vehicles.

Means to Solve the Problem

A transport operation control device according to one embodiment of this invention comprises an operation schedule calculating unit configured to calculate, based on a spatial distribution of products-in-process are transporting by one or a plurality of transport vehicles, an operation schedule defining a route and a frequency of a transport operation carried out by each of the one or the plurality of transport vehicles, and the operation schedule calculating unit is configured to determine a timing of updating the operation schedule on the basis of a change in productivity index obtained from the spatial distribution of the products-in-process.

A transport system according to one embodiment of this invention comprises one or a plurality of transport vehicles and a transport operation control device having a spatial distribution measuring function of measuring at least a spatial distribution of products-in-process being transported by the one or the plurality of transport vehicles; and an operation schedule calculating function of updating, at a timing based on a change in productivity index obtained from the measured spatial distribution of the products-in-process, an operation schedule defining a route and a frequency of a transport operation carried out by the one or the plurality of transport vehicles on the basis of the measured spatial distribution of the products-in-process.

A transport operation control method according to one embodiment of this invention comprises updating, at a timing based on a change in productivity index obtained from a spatial distribution of products-in-process being transported by one or a plurality of transport vehicles, an operation schedule defining a route and a frequency of a transport operation carried out by the one or the plurality of transport vehicles on the basis of the spatial distribution of the products-in-process.

A recording medium according to one embodiment of this invention records a transport operation control program causing a control unit of a computer to operate as an operation schedule calculating unit updating, at a timing based on a change in productivity index obtained from a spatial distribution of products-in-process being transported by one or a plurality of transport vehicles, an operation schedule defining a route and a frequency of a transport operation carried out by the one or the plurality of transport vehicles on the basis of the spatial distribution of the products-in-process.

Effect of the Invention

This invention provides a transport operation control device, a transport system, a transport operation control method, and a recording medium, which are capable of increasing productivity of an entire factory by transport operation control of efficiently transporting a large number of products-in-process via inter-workstation networks, even in a multiproduct variable-quantity type factory using transport vehicles.

EXAMPLE EMBODIMENT

First Example Embodiment (Description of Configuration)

A first embodiment of this invention will be described. A transport operation control device 1 controls a transport operation in a multiproduct variable-quantity type factory by using one or more transport vehicles. Each transport vehicle sequentially travels along routes (inter-workstation networks) set between workstations under control of the transport operation control device 1, and carries out loading/unloading of products-in-process at each workstation as necessary.

Figure 1:
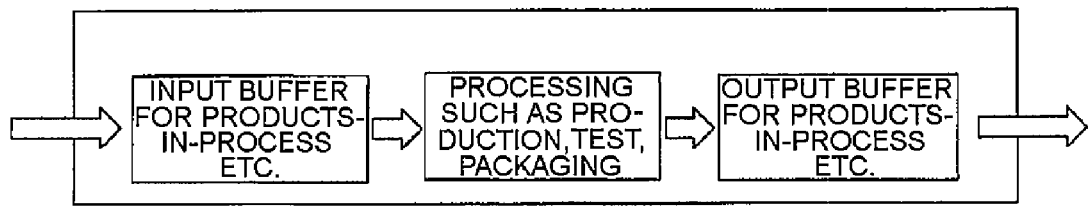
FIG. 1 is a view for representing one example of a workstation according to this invention.
Figure 2:
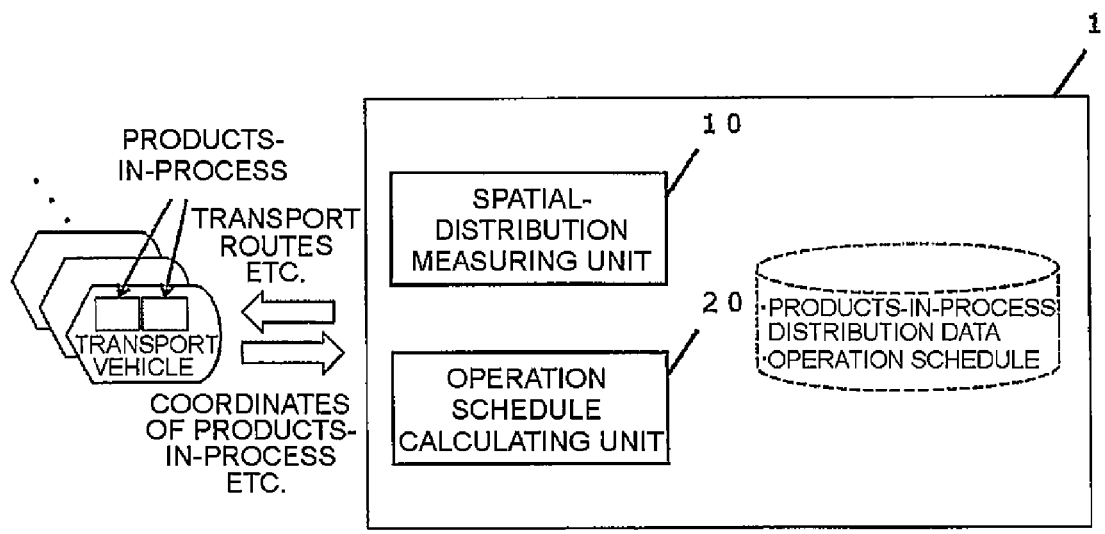
FIG. 2 is a block diagram for illustrating a configuration example of a transport operation control device according to a first embodiment of this invention.

In FIG. 2, a configuration example of the transport operation control device 1 according to this embodiment is illustrated. Description of typical constituent elements such as communication means and storage means will be omitted.

The transport operation control device 1 according to this embodiment comprises a spatial distribution measuring unit 10 and an operation schedule calculating unit 20. The transport operation control device 1 according to this embodiment is configured to be able to store products-inprocess distribution data being a measured spatial distribution of the products-in-process and a derived operation schedule. The operation schedule includes a route and a frequency when each transport vehicle carries out transport operations along a regular-period fixed route.

The spatial distribution measuring unit 10 measures, at a predetermined timing, a spatial distribution of a large number of the products-in-process (the quantity or the number of the products-in-process present at each location) transported by the transport vehicles or workers. The predetermined timing is, for example, every fixed time interval (10 seconds, 1 minute, 5 minutes, and so on). Measurements of the spatial distribution of the products-in-process may be carried out only in a time zone with a large workload or measurements may be carried out upon occurrence of a predetermined event, such as detection of a failure or an abnormality, which a user requests to measure.

As means for measurement of the spatial distribution of the products-in-process, a position of each individual product-in-process may be specified by using in-plant radio communication, a camera, an electronic tag, and so on, or each transport vehicle may inform the position of the products-in-process mounted thereon. For a position of the transport vehicle, markers preliminarily placed in the factory are read by the transport vehicle itself to specify a current position, or the transport vehicle is preliminary given map information including the shape and the layout of each structure in the factory and recognizes the shape of a surrounding environment by using a sensor such as LIDAR (Light Detection and Ranging, Laser Imaging Detection and Ranging) to estimate its own position. The spatial distribution measuring unit 10 may calculate the spatial distribution of the products-in-process on the basis of the specified positions of the products-in-process.

Furthermore, the spatial distribution measuring unit 10 may be configured to calculate one or a plurality of factory productivity indexes from the measured spatial distribution of products-in-process. For example, the spatial distribution measuring unit may be configured to calculate a factory productivity degradation index as one of the factory productivity indexes. The factory productivity degradation index is an index representative of decrease in productivity of the factory.

As an example of a method of calculating the factory productivity degradation index, the number of locations where the density of products-in-process is a predetermined or higher density (for example, $100/m^2$) may be obtained as a numerical value (index). Alternatively, as an example of a method of calculating the factory productivity degradation index, an absolute value (for example, 20 $m^2$ or more) of an area of the locations where the density of products-in-process is the predetermined or higher density or a ratio (for example, 20% or more) of the above-mentioned area with respect to an entire area may be obtained as a numerical value (index).

Furthermore, as the factory productivity degradation index, a value representative of a magnitude of spatial bias of the locations with the predetermined or higher density of the products-in-process may be obtained as a numerical value (because the productivity of the entire factory may possibly be lowered if the transport load is biased to particular regions).

Furthermore, as the factory productivity degradation index finally employed, a numerical value (index) calculated in consideration of a plurality of factory productivity degradation indexes mentioned by way of example may be used (example of calculation: the indexes are each weighted and then added together).

The spatial distribution measuring unit 10 may perform calculation of the factory productivity degradation index with reference to the spatial distribution of the products-in-process at a certain time instant, or may perform calculation after integrating the spatial distributions of the products-in-process in a range of a particular time window.

As the time window is longer, local change in distribution is averaged. Therefore, a mechanism may be provided to determine a mode of operation in a current measurement target region in the factory on the basis of time change of the spatial distribution of the products-in-process or past data thereof, and to automatically switch the time window into a time window corresponding to the mode of operation. The mode of operation is, for example, an index representative of a current operating situation of the measurement target region in the factory, such as in the middle of an unstable start-up operation, in the middle of a stable normal operation, in the middle of abnormal congestion, in the middle of a fault recovery operation, in the middle of regular maintenance, and so on.

The spatial distribution measuring unit 10 determines, when the factory productivity degradation index is calculated, whether or not the calculated factory productivity degradation index exceeds a predetermined threshold value.

The threshold value is determined from the spatial distribution of the products-in-process being transported, at the time when an unacceptable level of decrease in productivity, such as lead time delay or reduction in throughput, has occurred in the factory in the past.

The threshold value may be determined, for example, based on a measured value of the spatial distribution of the products-in-process being transported, at the time when the decrease in productivity of an unacceptable level has occurred in the past.

As regards calculation of the threshold value, the threshold value may be derived from the spatial distribution reflecting all of the products-in-process present in the factory. Alternatively, from local spatial distribution reflecting the products-in-process present in a predetermined region inside the factory, the threshold value in the local region may be derived.

The predetermined region inside the factory may be, for example, m×n cells (for example, m cells in a transversal direction, n cells in a longitudinal direction, m, n being natural numbers), a region having a radius of m meters, each region obtained by dividing the entire factory into m regions, a region where a specific operation is carried out, a predetermined important region, such as a place around a door at which a large number of AGV (Automatic Guided Vehicle) or people comes in and out and which tends to become a traffic bottleneck in view of layout.

The threshold value may be calculated by using, for the spatial distribution in the entire factory or the local spatial distribution (spatial integral value), an average value in a particular time range, a minimum value (if considered towards the safe side), a latest value being a value upon occurrence at a time instant closest from a current time instant (in case where the latest state of the factory is reflected), other statistical techniques, and so on.

Besides, variables may be appended to the threshold value so as to adjust the threshold value based on the experience and the knowledge of an on-site expert.

The operation schedule calculating unit 20 is configured to calculate, based on the measured spatial distribution of the products-in-process, the operation schedule defining a route and a frequency of a transport operation carried out by each transport vehicle. In this event, the operation schedule calculating unit 20 derives a new operation schedule so as to connect high-density portions in the spatial distribution of the products-in-process, where the quantity or the frequency of the transport operation is great or high. The operation schedule calculating unit 20 determines the timing of updating the operation schedule on the basis of a predetermined or greater change in productivity index obtained from the measured spatial distribution of the products-in-process. For the predetermined or greater change in productivity index, which serves as the timing of updating the operation schedule, a plurality of criteria (threshold values) may be defined. For example, a threshold value defining an allowable amount of a temporally quick change in productivity index and a threshold value defining an allowable amount of a temporally slow change in productivity index may appropriately be determined. As one specific example, the operation schedule calculating unit 20 may derive a new operation schedule when the factory productivity degradation index as one of the productivity indexes exceeds the threshold value.

The high-density portion in the spatial distribution of the products-in-process means a particular location in a space. For example, in case where a measurement target space is represented by a two-dimensional space segmented into grid-like cells, the location is given by a vertically x-th and horizontally y-th cell. On the other hand, in case where the measurement target space is represented by a graph structure in which the workstations to carry out transport operations and traveling therebetween comprise nodes and edges connecting the nodes, the location may be given by an x-th node. In case where the measurement target space is represented by a two-dimensional space, the location may be designated by a coordinate (x, y).

As one example of a connection method, the high-density portions are connected so that the transport vehicle can circulate the high-density portions in a shortest distance or in a shortest time. High-density means that, for the quantity of the products-in-process being transported in a particular cell, an absolute value at a particular time instant, or an integral value or an average value in a particular time window is greater than a predetermined value. Alternatively, high-density may indicate that the quantity is greater by a predetermined or higher ratio than the average value over a whole of the measurement target region. Alternatively, high-density may be defined by a combination thereof.

As another example of the connection method, the spatial distribution of the products-in-process is subjected to clustering by the density and centroids of clusters are connected in a shortest distance. In order to perform efficient circulation of the route, only those spots close to each other with a predetermined or less distance therebetween may be selected as connection objects upon connection, so that only close regions are included in the same route. Furthermore, the operation schedule may be prepared in the manner such that the connection objects are classified by predetermined density ranges (Example 1: classified by three ranges "top 30%, bottom 30%, others", Example 2: classified by two ranges "density of $30/m^2$ or more, others"). In this manner, it is possible to frequently circulate the portions where transportation of products-in-process is large in amount and to less frequently circulate the portions where the transportation is small in amount. Accordingly, a transport cost can be reduced.

As one example of the frequency of circulation of the transport vehicle, the frequency of circulation is determined in proportion to the magnitude of the average value or the maximum value of the density at a circulation target portion (example: work assignment to the transport vehicle is calculated assuming that a limited number of transport vehicles are continuously operated except a charging time to be utilized at maximum).

As described above, by deriving the operation schedule improved so that the transport vehicle efficiently pass the high-density portions, it is possible to reduce a traveling cost of each transport vehicle and to efficiently transport each product-in-process.

The derived operation schedule is appropriately notified to each transport vehicle to be used to control the transport operation in the multiproduct variable-quantity type factory. By operating the multiproduct variable-quantity type factory based on the operation schedule, throughput of an entire production line is increased.

(Description of Operation)

Figure 3:
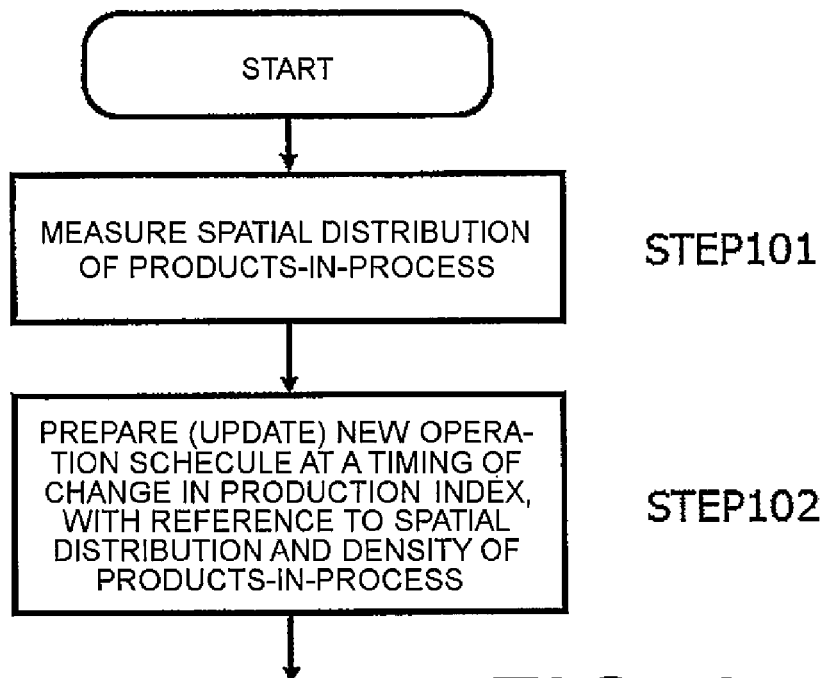
FIG. 3 is a flow chart for illustrating an operation example of the transport operation control device according to the first embodiment of this invention.

In FIG. 3, an operation example of the transport operation control device 1 according to this embodiment is illustrated.

At first, the transport operation control device 1 measures, by the spatial distribution measuring unit 10, the spatial distribution of the products-in-process transported by the respective transport vehicles (STEP 101).

Next, on the basis of change in productivity index obtained from the measured spatial distribution of the products-in-process, the transport operation control device 1 prepares (updates), by the operation schedule calculation unit 20, the operation schedule defining the route and the frequency of the transport operation carried out by each transport vehicle based on the measured spatial distribution of the products-in-process (STEP 102).

The operation schedule prepared in the above-mentioned step is confirmed by an operator as necessary, and then notified to each transport vehicle.

Thus, the transport operation control device 1 updates the operation schedule in conformity with the change in productivity index in order to control traveling of each transport vehicle. In this event, the transport operation control device 1 operates to repeat re-calculation of the operation schedule when the factory productivity degradation index exceeds a predetermined value, in order to prevent, for example, the degradation in on-site productivity from exceeding an allowable range.

(Effect)

As described above, the transport operation control device 1 calculates (updates) an operation schedule of circulating transport vehicles along regular-period fixed routes so that productivity of an entire factory is efficiently maintained on the basis of a spatial distribution of products-in-process being transported even in a multiproduct variable-quantity type factory where operation state is easily changed. In this manner, operation can efficiently be performed with a small number of the transport vehicles. The operation schedule is easy for people to understand because the regular-period fixed route is used.

If the condition for calculating (updating) a new operation schedule is determined, for example, based on the spatial distribution of the products-in-process being transported, at the time when an unacceptable decrease in productivity has occurred in the past, it is possible to prevent the operation schedule from being excessively frequently changed even in the multiproduct variable-quantity factory where the operation state changes with high frequency on a routine basis. Thus, by not changing the operation schedule in case where the change in productivity index has only a little influence upon the productivity, it is possible to reduce labor and time for re-arrangement of the respective transport vehicles and occurrence of unexperienced tasks following the application of the new operation schedule and to avoid a burden on the worker and an unexpected trouble.

Thus, with the transport operation control device according to this embodiment, it is possible to improve the productivity of the entire factory by transport operation control of efficiently transporting a large number of products-in-process via the inter-workstation networks, even in the multiproduct variable-quantity factory using the transport vehicle.

Hereinafter, this invention will be described with reference to a plurality of embodiments. The features of the respective embodiments may appropriately be combined. In each embodiment, description will be simplified or omitted with respect to those constituent elements or those operations already described.

Second Embodiment (Description of Configuration)

A second embodiment of this invention will be described.

Figure 4:
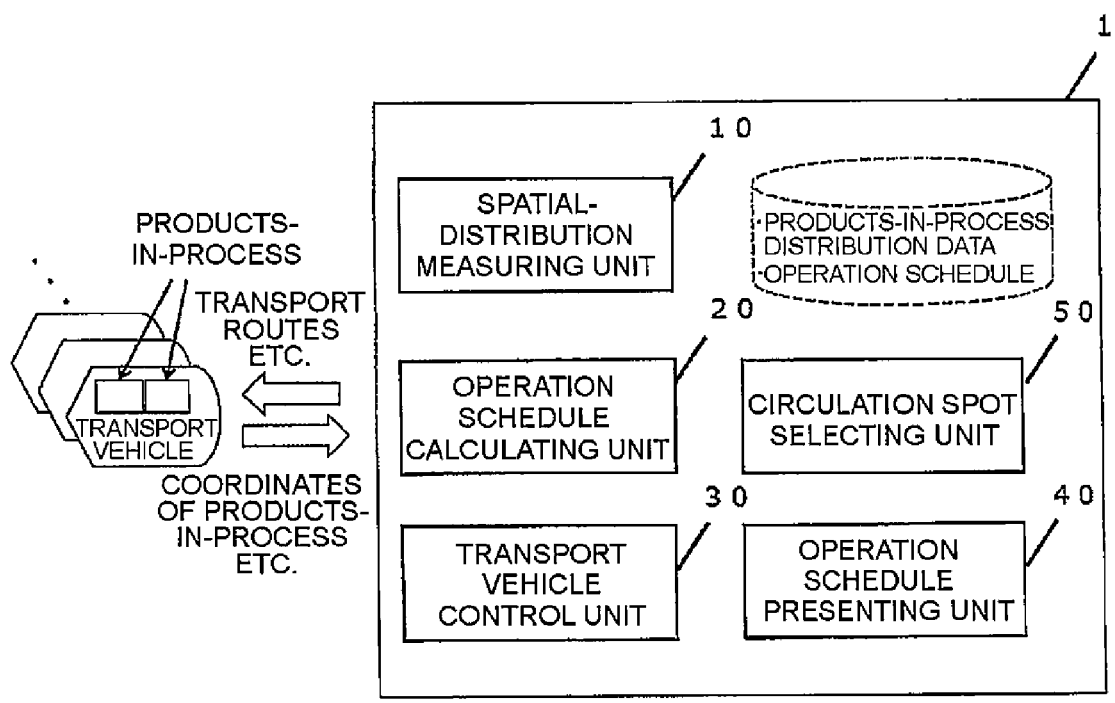
FIG. 4 is a block diagram for illustrating a configuration example of a transport operation control device according to a second embodiment of this invention.

In FIG. 4, a configuration example of a transport operation control device 1 according to this embodiment is illustrated.

The transport operation control device 1 according to this embodiment comprises the spatial distribution measuring unit 10, the operation schedule calculating unit 20, a transport vehicle control unit 30, an operation schedule presenting unit 40, and a circulation spot selecting unit 50. Among those, the spatial distribution measuring unit 10 and the operation schedule calculating unit 20 have already been described in the first embodiment and, therefore, description thereof will be simplified or omitted in this embodiment.

The transport vehicle control unit 30 operates transport vehicles in a real environment or in simulation reflecting features of the real environment, on the basis of the given operation schedule.

The operation schedule presenting unit 40 presents the calculated operation schedule to a user. In this event, a display unit or the like may display the route and the frequency or display a time table of a scheduled circulation time instant for each circulation point on the route.

Upon preparing the route connecting the high-density portions in the spatial distribution of the products-in-process, the circulation spot selecting unit 50 limits the connection objects to those in the vicinity of each individual workstation. The vicinity of the workstation is, for example, a range reachable in a predetermined distance or in a predetermined time interval from a center portion of the workstation. In this manner, it is possible to prevent simply congested locations, other than the workstations where loading and unloading are carried out, from being selected as the connection objects.

(Description of Operation)

Figure 5:
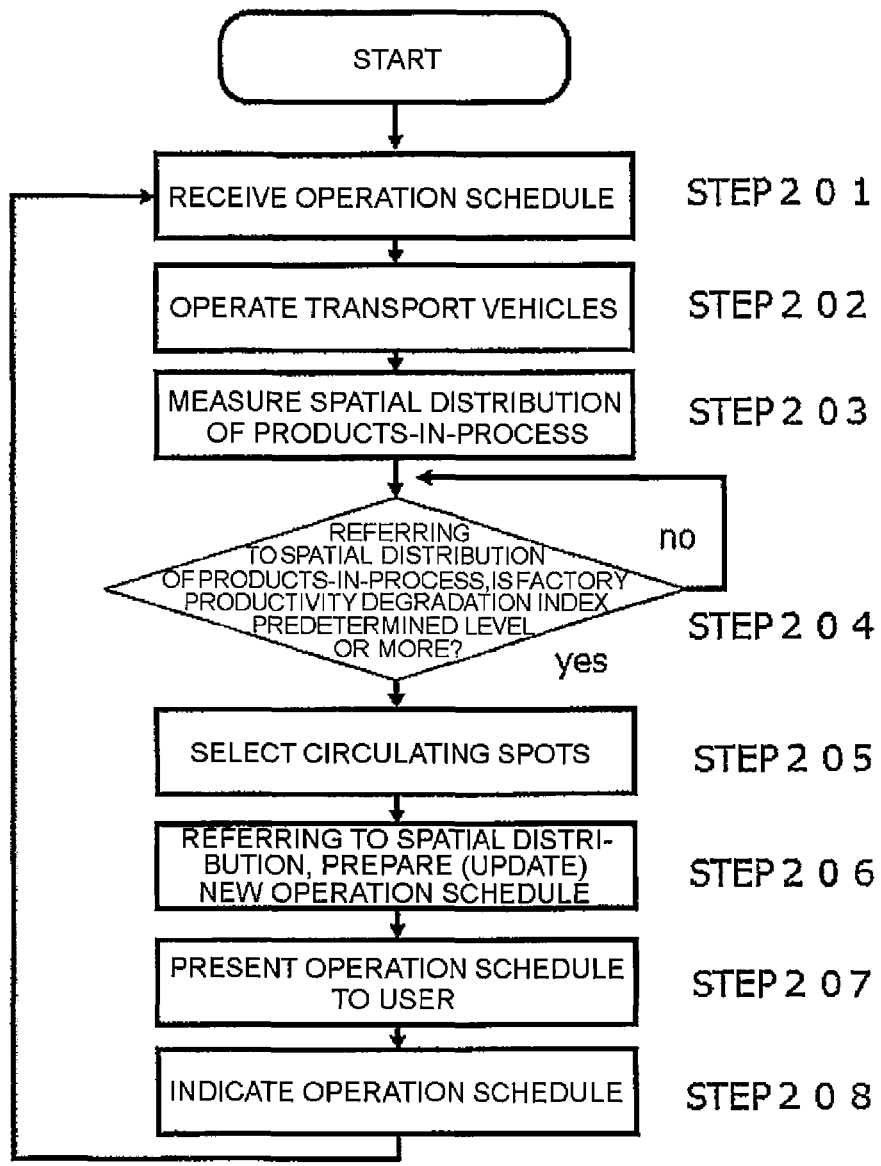
FIG. 5 is a flow chart for illustrating an operation example of the transport operation control device according to the second embodiment of this invention.

In FIG. 5, an operation example of the transport operation control device 1 is illustrated.

At first, the transport vehicle control unit 30 receives the operation schedule (STEP 201).

Next, the transport vehicle control unit 30 operates the transport vehicles in accordance with the received operation schedule (STEP 202).

Next, the spatial distribution measuring unit 10 measures the spatial distribution of the products-in-process being transported by the respective transport vehicles (STEP 203).

The spatial distribution measuring unit 10 refers to the spatial distribution of the products-in-process and, if the factory productivity degradation index is equal to or more than a predetermined value, operation proceeds to STEP 205. Otherwise, operation returns to STEP 203 (STEP 204).

If the factory productivity degradation index is equal to or more than the predetermined value, the circulation spot selecting unit 50 eliminates, in the spatial distribution of the products-in-process, those portions having a high density but remote from any of the workstations, as portions not to be included in the route of circulation (STEP 205). Thus, the circulation spot selecting unit 50 selects the route along which the transport vehicle circulates.

Next, the operation schedule calculation unit 20 prepares (updates) a new operation schedule by connecting those portions where the density of the products-in-process is high, in the spatial distribution of the products-in-process (STEP 206).

Next, the operation schedule presenting unit 40 presents the operation schedule prepared in STEP 206 to the user (STEP 207). In this event, the display unit or the like may display the operation schedule to request the user to check and approve the operation schedule. Alternatively, the operation schedule may be displayed on the display unit installed at an easily visible position so as to be checked if necessary, not for the purpose of approval. If the user does not desire confirmation of the prepared operation schedule for the purpose of labor saving or increase in speed of an improvement cycle, operation may directly proceed to STEP 208 without this step.

Finally, the operation schedule is indicated to the transport vehicle control unit 30 (STEP 208)

(Effect)

As described above, the transport operation control device 1 according to this embodiment calculates (updates) an operation schedule of circulating transport vehicles along regular-period fixed routes so that productivity of an entire factory is efficiently maintained on the basis of a spatial distribution of products-in-process being transported even in a multiproduct variable-quantity type factory where operation state is easily changed, like the transport operation control device 1 according to the first embodiment. In this manner, operation can efficiently be performed with a small number of the transport vehicles. The operation schedule is easy for people to understand because the regular-period fixed route is used.

Furthermore, with the transport operation control device 1 according to this embodiment, it is possible to prevent simply congested locations, other than the workstations where loading and unloading are carried out, from being selected as connection objects, and to improve transport efficiency.

Third Embodiment (Description of Configuration)

A third embodiment of this invention will be described.

Figure 6:
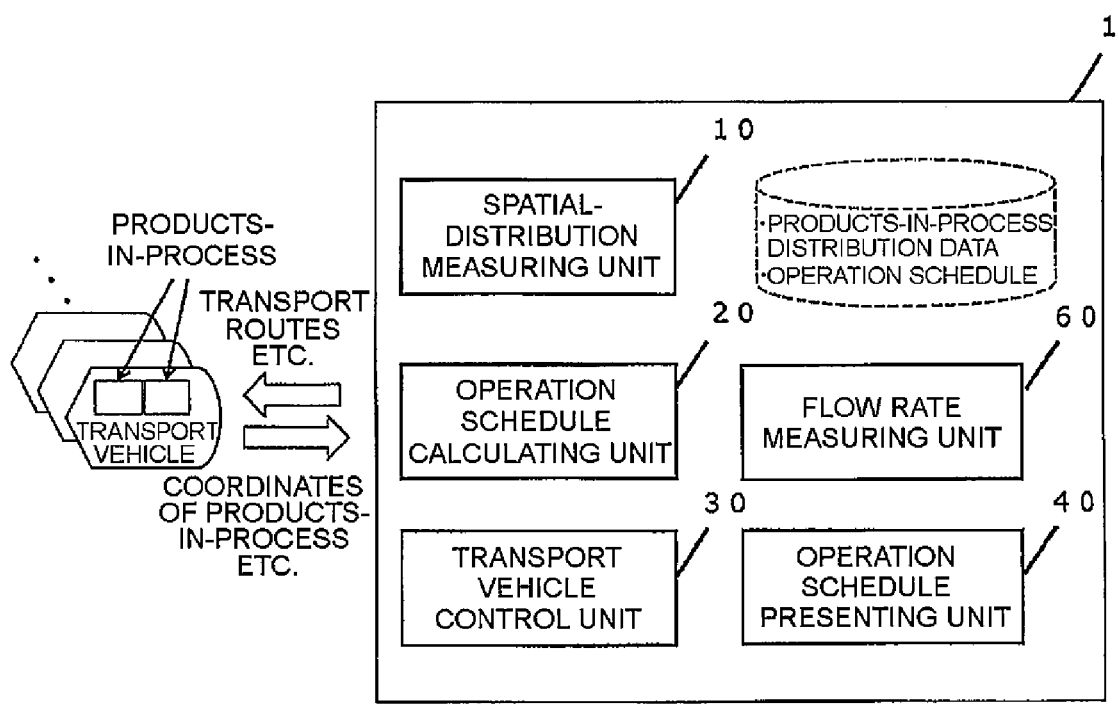
FIG. 6 is a block diagram for illustrating a configuration example of a transport operation control device according to a third embodiment of this invention.

In FIG. 6, a configuration example of a transport operation control device 1 according to this embodiment is illustrated.

The transport operation control device 1 according to this embodiment comprises the spatial distribution measuring unit 10, the operation schedule calculating unit 20, the transport vehicle control unit 30, the operation schedule presenting unit 40, and a flow rate measuring unit 60. Among those, the constituent elements except the flow rate measuring unit 60 have already been described in the first and the second embodiments and, therefore, description thereof will be simplified or omitted in this embodiment.

The flow rate measuring unit 60 is configured to measure a flow rate of each product-in-process (velocity of traveling of product-in-process to be transported).

The operation schedule calculating unit 20 in this embodiment prepares a new operation schedule so that the operation schedule includes those portions at which the flow rate of the products-in-process is high.

In this manner, it is possible to improve efficiency in traveling of transport vehicles because the portions at which the flow rate of the products-in-process is high are expected to be locations for the transport vehicles to easily pass.

(Description of Operation)

Figure 7:
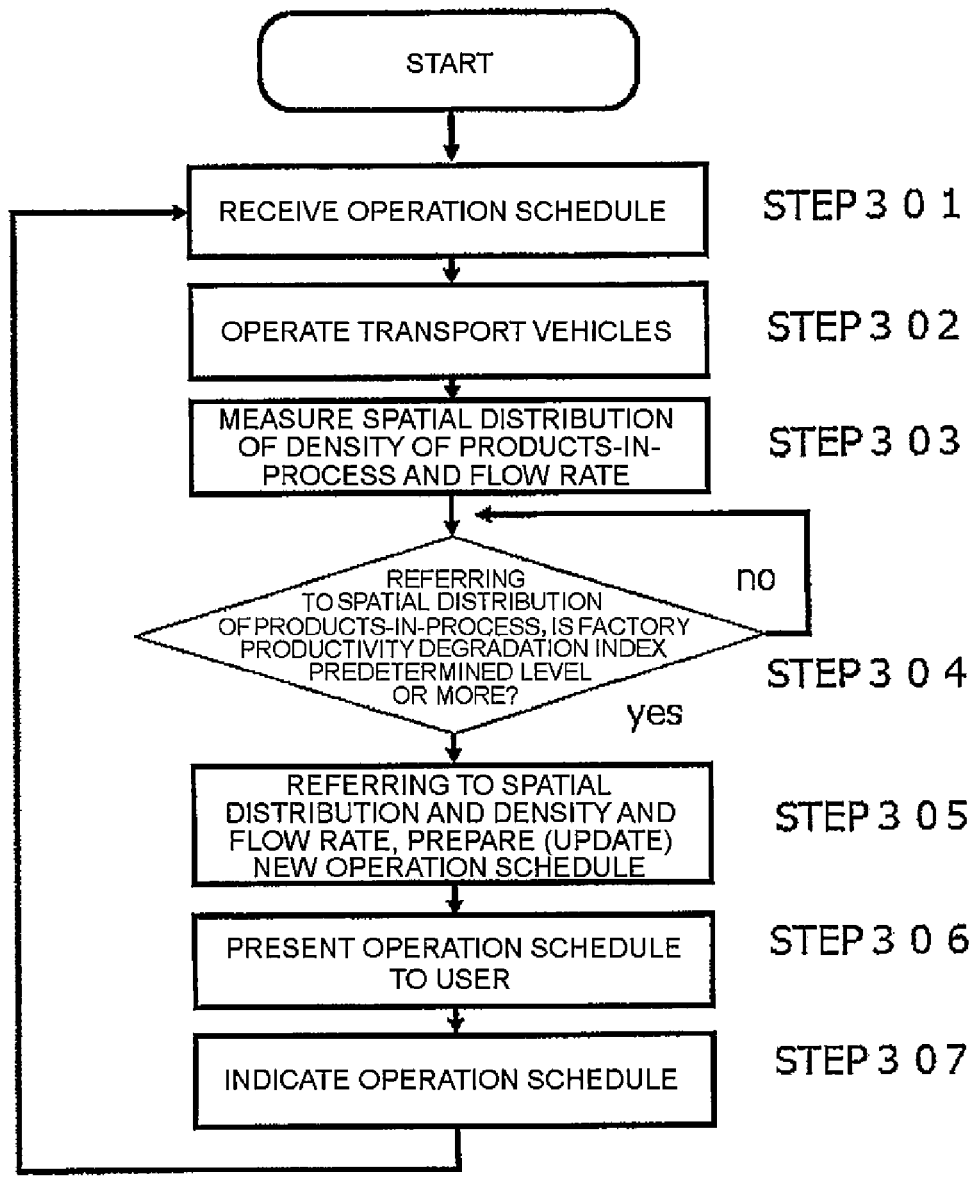
FIG. 7 is a flow chart for illustrating an operation example of the transport operation control device according to the third embodiment of this invention.

In FIG. 7, an operation example of the transport operation control device 1 according to this embodiment is illustrated. In this operation example, a difference from the transport operation control device 1 according to the second embodiment will be described. For example, STEPS 301, 302, 304, 306, and 307 may be same or similar operations as STEPS 201, 202, 204, 207, 208, respectively, of FIG. 5.

In addition to the operation of the transport operation control device 1 according to the second embodiment, the transport operation control device 1 according to this embodiment executes the following operation simultaneously with STEP 203 in the second embodiment. It is noted that the following operation may be executed between STEP 202 and STEP 203 or between STEP 203 and 204 in the second embodiment.

The flow rate measuring unit 60 measures flow rates of a large number of transported products-in-process transported by transport vehicles or workers, in parallel to density measurement of products-in-process by the spatial distribution measuring unit 10 (STEP 303).

When a new operation schedule is prepared (updated) by connecting the portions at which the density of the products-in-process is high, the operation schedule calculating unit 20 includes, in the connection objects, those portions at which the flow rate of the products-in-process is high (STEP 305). The criteria for determination of the portions at which the flow rate of the products-in-process is high are not limited. For example, whether or not average, median, or a mode of the velocity of traveling of the transported products-in-process is not smaller than a predetermined value in those portions may be used as the criteria. Alternatively, the portions at which the flow rate is greater by a predetermined ratio as compared with average of the flow rates in the surroundings (within a specific area, within a range in a predetermined distance, and so on) may be used as the criteria for determination.

(Effect)

As described above, the transport operation control device 1 according to this embodiment calculates (updates) an operation schedule of circulating transport vehicles along regular-period fixed routes so that productivity of an entire factory is efficiently maintained on the basis of a spatial distribution of products-in-process being transported even in a multiproduct variable-quantity type factory where operation state is easily changed, like the transport operation control device 1 according to the first embodiment. In this manner, operation can efficiently be performed with a small number of the transport vehicles. The operation schedule is easy for people to understand because the regular-period fixed route is used.

Furthermore, with the transport operation control device 1 according to this embodiment, it is possible to improve efficiency in traveling of transport vehicles because the transport vehicles pass through portions smoothly passable as compared with the transport operation control device 1 according to the first embodiment.

Fourth Embodiment (Description of Configuration)

A fourth embodiment of this invention will be described.

Figure 8:
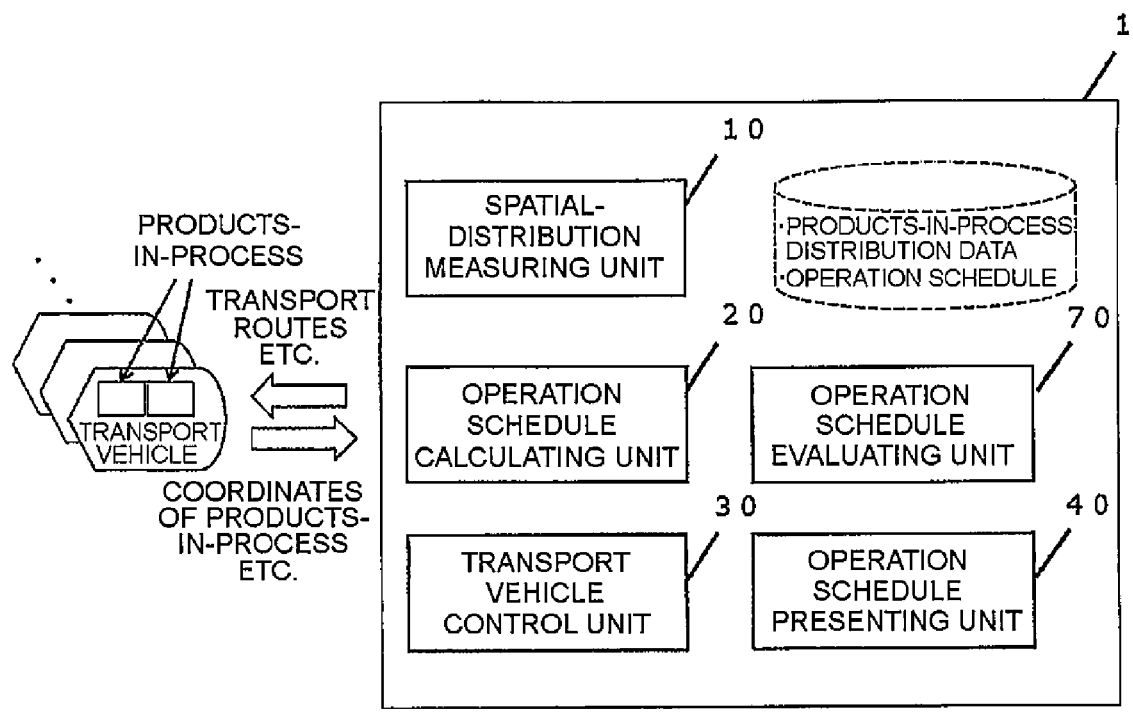
FIG. 8 is a block diagram for illustrating a configuration example of a transport operation control device according to a fourth embodiment of this invention.

In FIG. 8, a configuration example of a transport operation control device 1 according to this embodiment is illustrated.

The transport operation control device 1 according to this embodiment comprises the spatial distribution measuring unit 10, the operation schedule calculating unit 20, the transport vehicle control unit 30, the operation schedule presenting unit 40, and an operation schedule evaluating unit 70. Among those, the constituent elements except the operation schedule evaluating unit 70 have already been described in the first and the second embodiments and, therefore, description thereof will be simplified or omitted in this embodiment.

The operation schedule calculating unit 20 in this embodiment is different in that not a single but a plurality of operation schedules are calculated as candidates of the operation schedule to be adopted. The operation schedule calculating unit 20 changes a connection method of the above-mentioned high-density portions or the size of the time window and calculates a plurality of candidates for the operation schedule.

The operation schedule evaluating unit 70 evaluates productivity of each of the prepared plurality of operation schedules by using a predetermined index, and selects one having a highest evaluation value as an operation schedule to be newly executed. Examples of the evaluation index include a throughput of the entire factory or a part of lines thereof, a traveling cost of the transport vehicle, an operation rate of a transport vehicle, an operation rate of a manufacturing device in a workstation, an amount of intermediate stock, and so on Examples of an evaluation technique include multi-agent simulation using the transport vehicles and the workstations as agents, a technique of carrying out analysis by approximating the transportation of products-in-process to a fluid.

One example of a method of preparing an evaluation model will be described below.

It is assumed that a processing time at each workstation is represented by a predetermined probability distribution based on a statistical characteristic of the workstation and that products-in-process supplied to an input buffer are processed according to the probability distribution and outputted to an output buffer (a mathematical model representing such behavior will herein be called a workstation model).

It is assumed that a transport time from an output buffer of workstation as a delivery source of products-in-process to an input buffer of the workstation as a delivery destination is represented also by a predetermined probability distribution (a mathematical model representing such behavior will herein be called a transport model).

The evaluation model may be prepared by connecting a workstation model and a transport model according to a connection relationship on a geographic layout in a real factory (an output value of the model of a connection source is given as an input value of the model of a connection destination).

For example, by obtaining an output amount at a most downstream point of the evaluation model when an input amount of supply of products-in-process from a most upstream point is changed in various different patterns, various indexes such as the throughput and the amount of intermediate stock can be calculated.

(Description of Operation)

Figure 9:
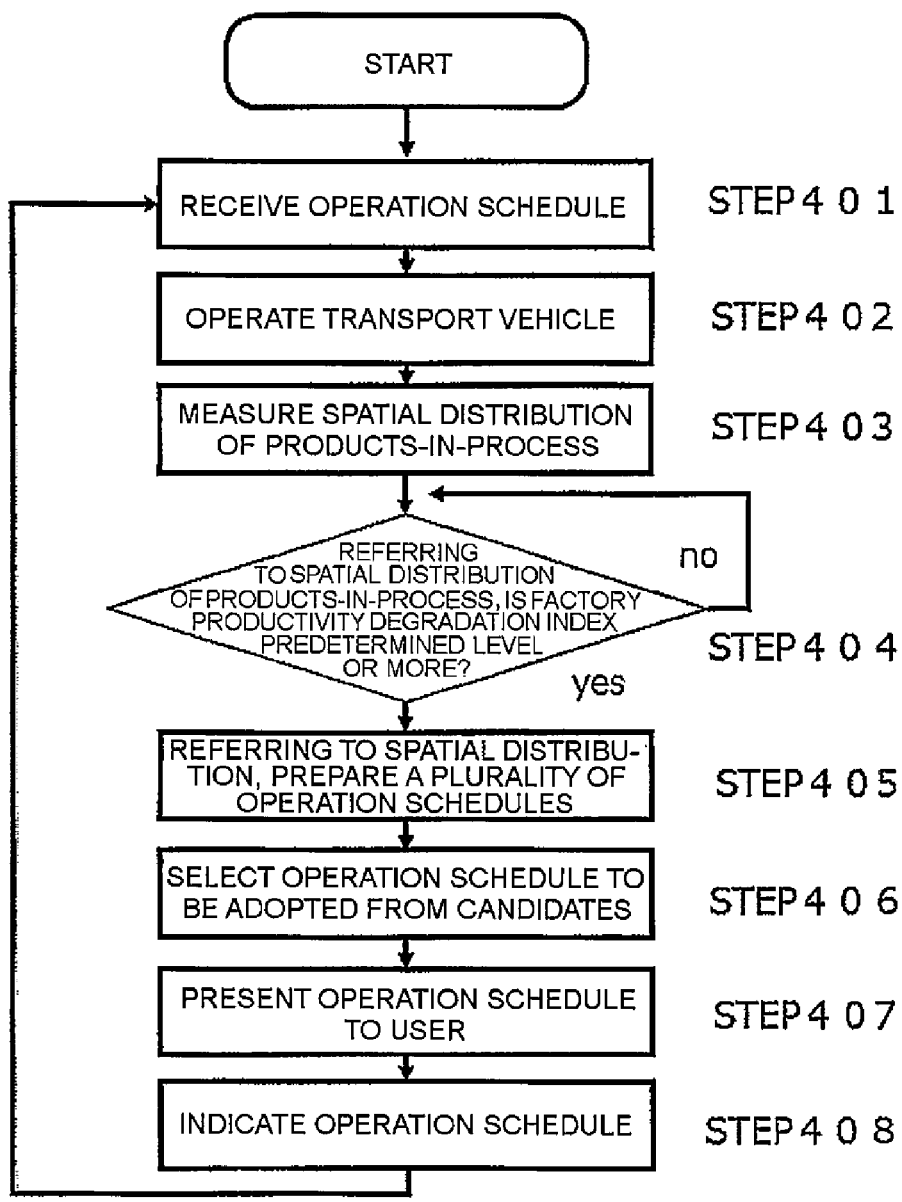
FIG. 9 is a flow chart for illustrating an operation example of the transport operation control device according to the fourth embodiment of this invention.

In FIG. 9, an operation example of the transport operation control device 1 according to this embodiment is illustrated. In this operation example, a difference from the transport operation control device 1 in the second embodiment will mainly be described. For example, STEPS 401, 402, 403, 404, 405, 407 and 408 may be same or similar operations as STEPS 201, 202, 203, 204, 206, 207 and 208, respectively, of FIG. 5.

In the transport operation control device 1 in this embodiment, in addition to the operation of the transport operation control device 1 according to the second embodiment, the operation schedule calculating unit 20 prepares a plurality of operation schedules as candidates for the operation schedule when a new operation schedule is prepared by connecting the high-density portions in STEP 205 of the second embodiment.

In addition to the operation of the second transport operation control device 1, the transport operation control device in this embodiment executes the following operation between STEP 205 and STEP 206.

The operation schedule evaluating unit 70 evaluates, based on the predetermined index, productivity of each of the prepared candidate operation schedules, and selects the one having the highest evaluation value as the new operation schedule to be executed (STEP 406).

(Effect)

As described above, the transport operation control device 1 according to this embodiment calculates (updates) an operation schedule of circulating transport vehicles along regular-period fixed routes so that productivity of an entire factory is efficiently maintained on the basis of a spatial distribution of products-in-process being transported even in a multiproduct variable-quantity type factory where operation state is easily changed, like the transport operation control device 1 according to the first embodiment. In this manner, operation can efficiently be performed with a small number of transport vehicles. The operation schedule is easy for people to understand because the regular-period fixed route is used.

Furthermore, with the transport operation control device 1 in this embodiment, it is possible to more efficiently improve productivity as compared with the transport operation control device 1 in the first embodiment because a best operation schedule is selected from a plurality of the candidates for the operation schedule.

[Operation Example]

Figure 10:
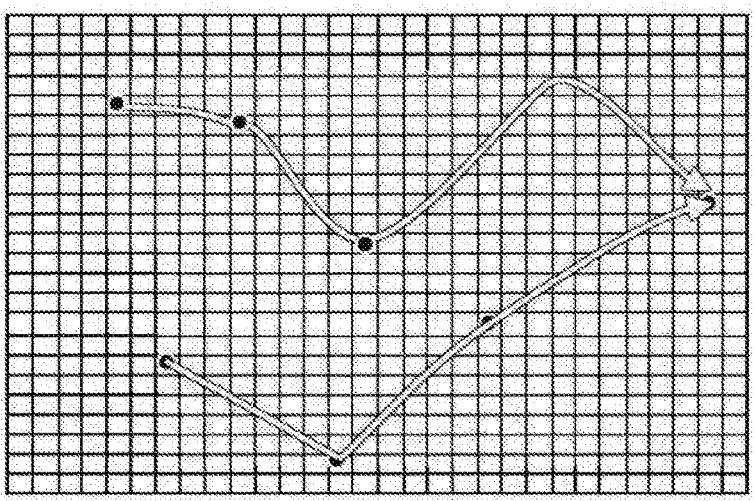
FIG. 10 is an explanatory diagram (No. 1) for use in describing a specific operation of the transport operation control device according to this invention.
Figure 11:
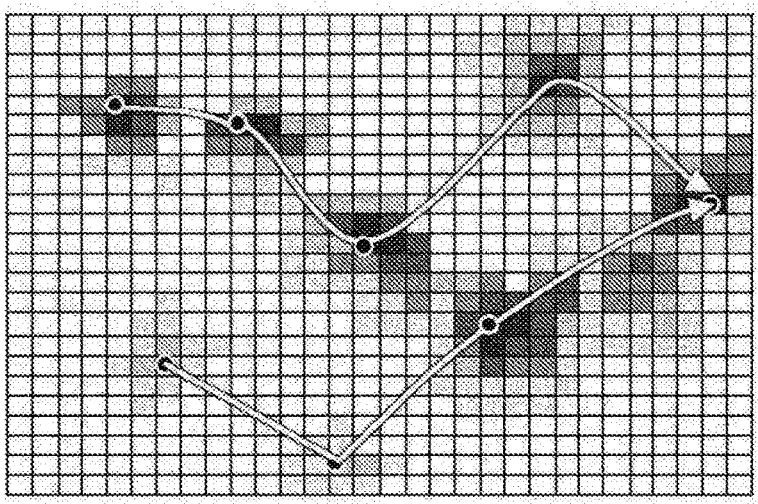
FIG. 11 is an explanatory diagram (No. 2) for use in describing the specific operation of the transport operation control device according to this invention.
Figure 12:
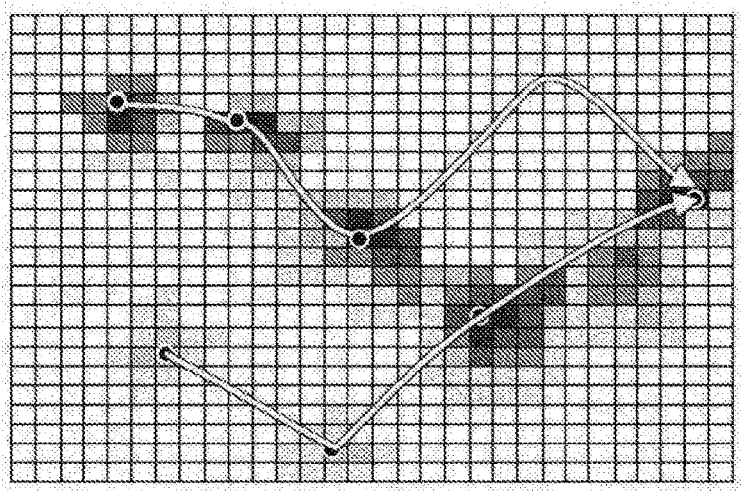
FIG. 12 is an explanatory diagram (No. 3) for use in describing the specific operation of the transport operation control device according to this invention.
Figure 13:
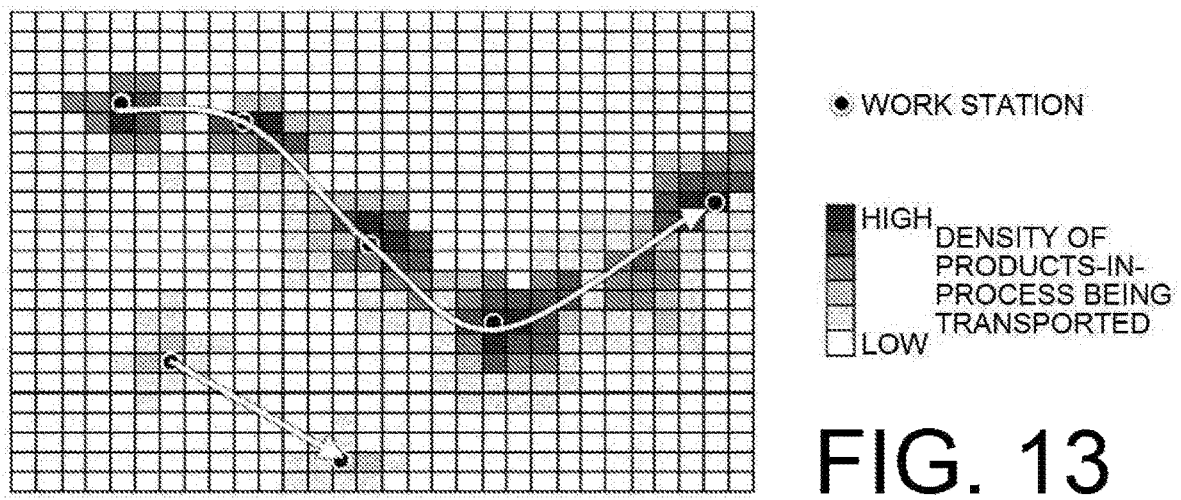
FIG. 13 is an explanatory diagram (No. 4) for use in describing the specific operation of the transport operation control device according to this invention.

Herein, this invention will be described with reference to one example of a process of deriving an operation schedule in the transport operation control device 1 according to this embodiment. Herein, taking the transport operation control device 1 in the second embodiment by way of example, description will be made using FIGS. 10 to 13 together with FIG. 5. In these figures, FIG. 10 is a view for illustrating one example of initial operation schedules, FIG. 11 is a view for illustrating a spatial distribution of products-in-process, FIG. 12 is a view for illustrating the initial operation schedules except a portion eliminated from connection objects, and FIG. 13 is a view for illustrating new operation schedules prepared by connecting high-density portions.

At first, the transport vehicle control unit 30 receives operation schedules of the transport vehicles (STEP 201). As one example of the operation schedules, use may be made of information indicative of a sequence of coordinates to sequentially pass through, which represents a route of circulation by each transport vehicle, and a circulation frequency. It is noted that the following coordinates correspond to a grid with an upper left cell defined as (1, 1) in the figures illustrated in FIGS. 10 to 13. The transport vehicle control unit 30 receives the information and proceeds to a next process.

{(5, 5), (10, 6), (15, 12), (23, 4), (29, 10): every 15 minutes},

{(7, 18), (14, 23), (20, 16), (29, 10): every 15 minutes}

The operation schedules illustrated in FIG. 10 exemplify the initial (current) operation schedules. Herein, the measurement target space is segmented into grid-like cells. The transport operation control device 1 (spatial distribution measuring unit 10) measures a spatial distribution of products-in-process being transported in the respective cells. Each workstation is represented by a circle and each route and its direction is represented by an arrow.

Although not described in this specific example, the transport vehicle may sequentially receive, as another example of the operation schedules, a sequence of operations to be executed.

{go forward by 20 meters, confirm a marker, turn by 90 degrees, go forward by 10 meters . . . }

Next, the transport vehicle control unit 30 operates the respective transport vehicles according to the received operation schedules (STEP 202). For example, the transport vehicle may autonomously travel while estimating its own position using the markers placed at designated positions or may travel while confirming the position by communicating with a central control device by radio or the like.

Next, the spatial distribution measuring unit 10 measures the spatial distribution of the products-in-process transported by the respective transport vehicles (STEP 203).

In FIG. 11, one example of the spatial distribution corresponding to the operation schedules in FIG. 10 is illustrated. Herein, the density of products-in-process in each cell is represented by six levels. As a color of the cell is darker, the amount of the products-in-process is greater (density is higher). As the density is higher, more frequent circulation is required.

Referring to FIG. 11, at an upper right position in FIG. 11, there is a cluster of cells at which no workstation exists but the amount of the products-in-process being transported is locally large, i.e., the products-in-process being transported are staying. This represents that the cells easy to be congested are contained in the middle of the route of circulation.

The two workstations at a lower left position in FIG. 11 is in a state where, although the amount of the transported products-in-process is small, the circulation frequency is same as that of the workstation at which the amount of the transported products-in-process is large.

Next, the circulation spot selecting unit 50 eliminates those cells having many products-in-process but remote from the workstations by a predetermined distance or more (STEP 205). FIG. 12 represents the spatial distribution of the products-in-process except the cluster of the cells at the upper right position in FIG. 11 where no workstation is present but the products-in-process are staying.

Next, the operation schedule calculating unit 20 prepares new operation schedules based on the spatial distribution of the products-in-process in FIG. 12 (STEP 206). Hereinafter, the detail will be described.

At first, the operation schedule calculating unit 20 divides the spatial distribution of the products-in-process in FIG. 12 into the following two clusters with reference to whether the density is high or low.

Cluster 1: {(29, 10), (5, 5), (15, 12), (20, 16), (10, 6),}
Cluster 2: {(14, 23), (7, 18),}

Subsequently, a new route of circulation is prepared for each of the clusters. Herein, the workstations at a shortest distance in each cluster are connected.

Route 1: {(5, 5), (10, 6), (15, 12), (20, 16), (29, 10)}
Route 2: {(7, 18), (14, 23)}

As a connection method other than that described above, consideration may be made of a limitation in sequential order which is different depending on a type of the products-in-process. Alternatively, the route may be prepared by using map information related to obstacles as follows.

given map information based on CAD of factory layout (positions of the obstacles, etc.)
information of locations suddenly determined impassable, received from a transport vehicle or the like Subsequently, the operation schedule calculating unit 20 determines a circulation frequency of each route based on the prepared new route and the spatial distribution of the products-in-process in each cluster. In this example, the density of the products-in-process in each cell is classified into six levels, as described before. Herein, the circulation frequency is determined based on the density of the cell having a highest density in the cluster. Herein, it is assumed that the circulation is required with the following frequency per density.

cluster including a cell having the first highest density: one circulation in 15 minutes
cluster including a cell having the second highest density: one circulation in 20 minutes
cluster including a cell having the third highest density: one circulation in 25 minutes
cluster including a cell having the fourth highest density: one circulation in 30 minutes
cluster including a cell having the fifth highest density: one circulation in 35 minutes
cluster including a cell having the sixth highest density: no regular circulation In this example, the density of the cell having the highest density in cluster 1 corresponds to "the cell having the first highest density" and, therefore, the circulation frequency is "one circulation in 15 minutes." On the other hand, the density of the cell having the highest density in cluster 2 corresponds to "the fourth highest density" and, therefore, the circulation frequency is "one circulation in 30 minutes." From the foregoing, the following new operation schedules are prepared.

operation schedule 1: {(5, 5), (10, 6), (15, 12), (20, 16), (29, 10): every 15 minutes}
operation schedule 2: {(7, 18), (14, 23): every 30 minutes}

FIG. 13 represents the newly prepared operation schedules. As compared with the initial operation schedules (FIG. 10), the circulation frequency for the workstations with less products-in-process is reduced so as to save the transport cost. Furthermore, by eliminating the congested point which is not the workstation, the efficiency of transportation can be improved.

In the foregoing, the circulation frequency preliminarily determined per density is selected. As another method, the operation schedules may be prepared so that allocation of the transport vehicles is carried out on the basis of a given limitation on the transport cost (for example, circulation of the transport vehicle is allowed eight times in total per one hour). In this case, the transport vehicles are allocated, for example, on the basis of a ratio of the maximum density per route. Assuming that the ratio of the maximum density between the route 1 and the route 2 is 3 to 1, the circulation frequency of the route 1 is once in 10 minutes and the circulation frequency of the route 2 is once in 30 minutes. In this case, the newly prepared operation schedules are as follows.

operation schedule 1: {(5, 5), (10, 6), (15, 12), (20, 16), (29, 10): every 10 minutes}
operation schedule 2: {(7, 18), (14, 23): every 30 minutes}

As described above, with the transport operation control device to which this invention is applied, it is possible to increase productivity in an entire factory by the transport operation control of efficiently transporting a large number of products-in-process via inter-workstation networks, even in a multiproduct variable-quantity type factory using transport vehicles.

Figure 14:
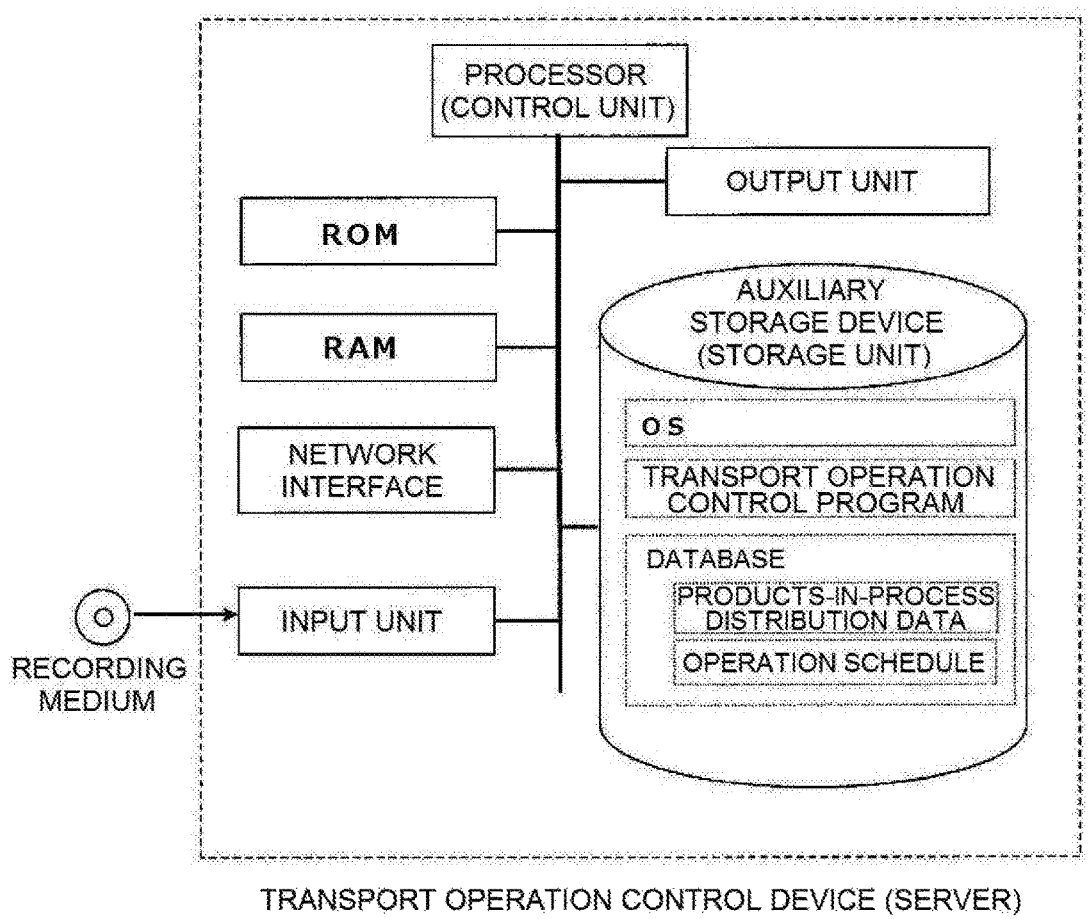
FIG. 14 is a block diagram for illustrating a specific configuration example of the transport operation control device.

Each unit of the transport operation control device may be implemented by using a combination of hardware and software of a computer system exemplified in FIG. 14. The computer system comprises one or a plurality of processors and a memory in conformity with a desired mode. In the mode of the computer system, each unit may be implemented by developing a transport operation control program in the memory and operating the hardware such as the one or the plurality of processors and so on by a group of execution instructions and a group of codes on the basis of the program. In this event, as necessary, the program may implement each unit in cooperation with functions provided by the software such as an operating system, a microprogram, and a driver.

Program data developed in the memory appropriately includes the group of execution instructions and the group of codes for operating the processor as one or a plurality of the above-mentioned units, a table file, contents data, and so on.

The computer system need not necessarily be constructed as a single device but may be constructed as a so-called thin client, distributed computing, or cloud computing by a combination of a plurality of servers/computers/virtual machines. A part of or all parts of the computer system may be replaced by hardware or firmware (for example, one or a plurality of LSIs: Large-Scale Integration, FPGA: Field Programmable Gate Array, a combination of electronic elements). Similarly, only a part of each unit may be replaced by hardware or firmware.

The program may be non-transitorily recorded in a recording medium to be distributed. The program recorded in the recording medium is read into the memory via wire, wirelessly, or the recording medium itself to operate the processor and so on.

In the present description, the recording medium includes a storage medium, a memory device, a storage device, and so on as similar terms. The recording medium is exemplified by an optical disk, a magnetic disk, a semiconductor memory device, a hard disk device, tape media, and so on. The recording medium is desirably non-transitory. The recording medium may comprise a combination of a volatile module (for example, RAM: Random Access Memory) and a non-transitory module (for example, ROM: Read Only Memory).

Describing the above-mentioned mode in another expression, the processor is operated, based on the transport operation control program developed in the memory, as spatial distribution measuring means, operation schedule calculating means, transport vehicle control means, operation schedule presenting means, circulation spot selecting means, flow rate measuring means, and operation schedule evaluating means. As a result, the transport operation control device can be implemented.

Similarly, describing the above-mentioned mode in still another expression, the recording medium includes the transport operation control program developed in the memory to operate with information processing resources, and makes the information processing resources appropriately execute a spatial distribution measuring step, an operation schedule calculating step, a transport vehicle control step, and so on. Thus, the transport operation control device is constructed.

This invention has been described with reference to the embodiments by way of example. However, the specific structure of this invention is not limited to the foregoing embodiments but this invention encompasses any modification within a scope not departing from the gist of this invention. For example, modifications such as separation and combination of the block structures in the foregoing embodiments and replacement of the steps may be freely made as far as the gist of this invention and the functions described are satisfied. This invention is never limited by the foregoing description.

A part or a whole of the foregoing embodiments may be described as follows. It is noted that the following supplementary notes do not limit this invention at all.

[Supplementary Note 1]

A transport operation control device comprising:
a spatial distribution measuring unit configured to measure a spatial distribution of products-in-process being transported by one or a plurality of transport vehicles; and
an operation schedule calculating unit configured to calculate, based on the measured spatial distribution, an operation schedule defining a route and a frequency of a transport operation carried out by each of the one or the plurality of transport vehicles;
the operation schedule calculating unit being configured to determine a timing of updating the operation schedule on the basis of a change in productivity index obtained from the measured spatial distribution of the products-in-process.

[Supplementary Note 2]

The transport operation control device according to Supplementary Note 1, wherein the transport operation control device further comprises a transport vehicle control unit configured to operate, based on the operation schedule calculated by the operation schedule calculating unit, each transport vehicle in conformity with a real environment or with simulation reflecting features of the real environment.

[Supplementary Note 3]

The transport operation control device according to Supplementary Note 1 or 2, further comprising an operation schedule presenting unit configured to present the calculated operation schedule to a user.

[Supplementary Note 4]

The transport operation control device according to any one of Supplementary Notes 1 to 3, wherein:
the transport operation control device is configured to hold a threshold value of a factory productivity degradation index being an index representative of degradation in productivity of a factory;
the operation schedule calculating unit is configured to calculate the factory productivity degradation index obtained from the measured spatial distribution of the products-in-process, and to determine the timing of updating the operation schedule on the basis of the calculated value of the factory productivity degradation index and the threshold value of the factory productivity degradation index.

[Supplementary Note 5]

The transport operation control device according to Supplementary Note 4, wherein the factory productivity degradation index is calculated on the basis of at least one of the number of locations where the density of the products-in-process is a predetermined or higher density, an absolute value of an area of the locations where the density of products-in-process is the predetermined or higher density or a ratio of the area with respect to an entire area, and a value representative of a magnitude of spatial bias of the locations with the predetermined or higher density of the products-in-process.

[Supplementary Note 6]

The transport operation control device according to Supplementary Note 4 or 5, wherein the factory productivity degradation index is calculated by referring to the spatial distribution of the products-in-process groups at a particular time instant or by integrating the spatial distributions of the products-in-process groups in a range of a particular time window which is switchable in response to a mode of operation.

[Supplementary Note 7]

The transport operation control device according to any one of Supplementary Notes 1 to 6, wherein the operation schedule calculating unit is configured to prepare the operation schedule by connecting high-density portions in the spatial distribution of the products-in-process measured by the spatial distribution measuring unit.

[Supplementary Note 8]

The transport operation control device according to Supplementary Note 7, wherein the operation schedule calculating unit is configured to determine a height of a density of the products-in-process by at least one index selected from indexes indicating, for the quantity of the products-in-process being transported, that an absolute value at a particular time instant, or an integral value or an average value in a particular time window is greater than a predetermined value, that the quantity is greater by a predetermined or higher ratio than the average value over a whole of a measurement target region.

[Supplementary Note 9]

The transport operation control device according to Supplementary Note 7 or 8, wherein the operation schedule calculating unit is configured to connect those portions at which the density of the products-in-process is high so that circulation is performed in a shortest distance or in a shortest time.

[Supplementary Note 10]

The transport operation control device according to any one of Supplementary Notes 7 to 9, wherein the operation schedule calculating unit is configured to perform clustering, by the density, on spatial distribution of the products-in-process and to connect centroids of clusters in a shortest distance.

[Supplementary Note 11]

The transport operation control device according to any one of Supplementary Notes 7 to 10, wherein the operation schedule calculating unit is configured to prepare the operation schedule by selecting, as connection objects upon connection, only those portions close to each other with a predetermined or less distance therebetween in the spatial distribution of the products-in-process, so that only those transport vehicles close to each other in the spatial distribution of the products-in-process are included in the same route.

[Supplementary Note 12]

The transport operation control device according to any one of Supplementary Notes 7 to 11, wherein the operation schedule calculating unit is configured to prepare the operation schedule by classifying the connection objects by predetermined density ranges.

[Supplementary Note 13]

The transport operation control device according to any one of Supplementary Notes 1 to 12, wherein the operation schedule calculating unit is configured to determine a circulation frequency in proportion to a magnitude of an average value or a maximum value of the density of the products-in-process in a portion as an object of circulation.

[Supplementary Note 14]

The transport operation control device according to any one of Supplementary Notes 1 to 13, further comprising a circulation spot selecting unit configured to limit the route of the transport operation carried out by each of the one or the plurality of transport vehicles to the vicinity of workstations.

[Supplementary Note 15]

The transport operation control device according to Supplementary Note 14, wherein the circulation spot selecting unit recognizes the vicinity of a workstation as a range reachable in a predetermined distance or in a predetermined time interval from a center portion of the workstation.

[Supplementary Note 16]

The transport operation control device according to any one of Supplementary Notes 1 to 15, further comprising:
a flow rate measuring unit configured to measure a flow rate of the products-in-process included in the measured spatial distribution of the products-in-process;
the operation schedule calculating unit being configured to prepare, upon updating the operation schedule, a new operation schedule so that the new operation schedule includes a part of an existing route at which the flow rate of the products-in-process is high.

[Supplementary Note 17]

The transport operation control device according to any one of Supplementary Notes 1 to 16, wherein:
the operation schedule calculating unit is further configured to calculate a plurality of operation schedules as candidates;
the transport operation control device further comprising:
an operation schedule evaluating unit configured to evaluate the plurality of operation schedules calculated by the operation schedule calculating unit to select a best one.

[Supplementary Note 18]

The transport operation control device according to Supplementary Note 17, wherein the operation schedule evaluating unit is configured to evaluate the operation schedule by using, as an index, at least one of a throughput of an entire factory or a part of lines thereof, a traveling cost of the transport vehicle, an operation rate of the transport vehicle, and an operation rate of a manufacturing device in each workstation.

[Supplementary Note 19]

A transport system comprising:
one or a plurality of transport vehicles; and
a transport operation control device having:
a spatial distribution measuring function of measuring a spatial distribution of products-in-process transported by the one or the plurality of transport vehicles; and
an operation schedule calculating function of updating, at a timing based on a change in productivity index obtained from the measured spatial distribution of the products-in-process, an operation schedule defining a route and a frequency of a transport operation carried out by the one or the plurality of transport vehicles on the basis of the measured spatial distribution of the products-in-process.

[Supplementary Note 20]

A transport system control method comprising:
measuring a spatial distribution of products-in-process being transported by one or a plurality of transport vehicles;
updating, at a timing based on a change in productivity index obtained from the measured spatial distribution of the products-in-process, an operation schedule defining a route and a frequency of a transport operation carried out by the one or the plurality of transport vehicles on the basis of the measured spatial distribution of the products-in-process.

[Supplementary Note 21]

A recording medium recording a transport operation control program causing a control unit of a computer to operate as:
a spatial distribution measuring unit configured to measure a spatial distribution of products-in-process being transported by one or a plurality of transport vehicles; and
an operation schedule calculating unit configured to update, at a timing based on a change in productivity index obtained from the measured spatial distribution of products-in-process, an operation schedule defining a route and a frequency of a transport operation carried out by the one or the plurality of transport vehicles on the basis of the measured spatial distribution of the products-in-process.

[Supplementary Note 22]

A recording medium non-transitorily recording a program causing a processor of a computer, which is operated as a transport operation control device controlling one or a plurality of transport vehicles included in a transport system, to be operated as:
a spatial distribution measuring unit configured to detect a position of each of products-in-process transported by the one or the plurality of transport vehicles and to measure a spatial distribution of detected products-in-process;
an operation schedule calculating unit configured to calculate, from the spatial distribution of the products-in-process measured by the spatial distribution measuring unit, based on a difference in density of the products-in-process in each section in an operation space, an operation schedule defining a route and a frequency of a transport operation carried out by each of the one or the plurality of transport vehicles, and to determine a timing of updating the operation schedule on the basis of a change in productivity index obtained from the measured spatial distribution of the products-in-process; and
a transport vehicle control unit configured to operate, based on the operation schedule calculated by the operation schedule calculating unit, each transport vehicle via radio communication in conformity with a real environment or with simulation reflecting features of the real environment.

[Supplementary Note 23]

A recording medium non-transitorily recording a program causing a processor of a computer, which is operated as a transport operation control device controlling one or a plurality of transport vehicles included in a transport system used in a multiproduct variable-quantity type factory, to be operated as:

a spatial distribution measuring unit configured to detect a position of each of products-in-process transported by the one or the plurality of transport vehicles and to successively measure a spatial distribution of detected products-in-process;

an operation schedule calculating unit configured to calculate, based on a difference in density of the products-in-process in each section in an operation space with reference to the spatial distribution of the products-in-process measured by the spatial distribution measuring unit, an operation schedule defining inter-workstation networks and a frequency of a transport operation carried out through the inter-workstation networks, the inter-workstation networks being a route through which the one or the plurality of transport vehicles travel and connecting via a network path a particular workstation and another workstation installed in a multiproduct variable-quantity type factory, and to determine a timing of updating the operation schedule on the basis of a change in productivity index obtained from the measured spatial distribution of the products-in-process; and a transport vehicle control unit configured to control via radio communication, based on the operation schedule calculated by the operation schedule calculating unit, each transport vehicle being operated in the multiproduct variable-quantity factory in conformity with a real environment or with simulation reflecting features of the real environment.

EXPLANATION OF SYMBOLS 1 transport operation control device
10 spatial distribution measuring unit
20 operation schedule calculating unit
30 transport vehicle control unit
40 operation schedule presenting unit
50 circulation spot selecting unit
60 flow rate measuring unit
70 operation schedule evaluating unit

The invention claimed is:

1. A transport operation control device comprising:
at least one memory storing instructions; and
at least one processor configured to execute the instructions to:
measure a spatial distribution of products-in-process being transported by one or more transport vehicles;
calculate, based on the spatial distribution of the products-in-process, an operation schedule defining a route and a frequency of a transport operation carried out by each of the one or more transport vehicles;
determine a timing of updating the operation schedule based on a change in productivity index obtained from the spatial distribution of the products-in-process;
hold, as the productivity index, a threshold value of a factory productivity degradation index, which is representative of degradation in productivity of a factory;
calculate the factory productivity degradation index obtained from the measured spatial distribution of the products-in-process;
determine the timing of updating the operation schedule further based on the calculated value of the factory productivity degradation index exceeding the threshold value of the factory productivity degradation index, the threshold value of the factory productivity degradation index corresponding to at least one of an allowable amount of a quick change in the productivity index and an allowable amount of a slow change in the productivity index; and
control the one or more transport vehicles based on the operation schedule.

2. The transport operation control device according to claim 1, wherein the at least one processor is further configured to execute the instructions to:
operate, based on the operation schedule, each of the one or more transport vehicles in conformity with a real environment or with simulation reflecting features of the real environment.

3. The transport operation control device according to claim 1, wherein the factory productivity degradation index is calculated based on at least one of the number of locations where the density of the products-in-process is a predetermined or higher density, an absolute value of an area of the locations where the density of the products-in-process is the predetermined or higher density or a ratio of the area with respect to an entire area, and a value representative of a magnitude of spatial bias of the locations with the predetermined or higher density of the products-in-process.

4. The transport operation control device according to claim 1, wherein the at least one processor is further configured to execute the instructions to:
limit the route of the transport operation carried out by each of the one or more transport vehicles to the vicinity of workstations.

5. The transport operation control device according to claim 1, wherein the at least one processor is further configured to execute the instructions to:
measure a flow rate of the products-in-process included in the measured spatial distribution of the products-in-process;
prepare, upon updating the operation schedule, a new operation schedule so that the new operation schedule includes a part of an existing route at which the flow rate of the products-in-process is high.

6. The transport operation control device according to claim 1, wherein the at least one processor is further configured to execute the instructions to:
calculate a plurality of operation schedules as candidates; and
evaluate the plurality of operation schedules to select a best one.

7. A transport system control method comprising:
measuring a spatial distribution of products-in-process being transported by one or more transport vehicles;
calculating, based on the spatial distribution, an operation schedule defining a route and a frequency of a transport operation carried out by each of the one or more transport vehicles;
determining a timing of updating the operation schedule based on a change in productivity index obtained from the spatial distribution of the products-in-process;
updating, at a timing based on a change in productivity index obtained from the spatial distribution of the products-in-process being transported by one or more transport vehicles, an operation schedule defining a route and a frequency of a transport operation carried out by the one or more transport vehicles based on the spatial distribution of the products-in-process holding, as the productivity index, a threshold value of a factory productivity degradation index, which is representative of degradation in productivity of a factory;

calculating the factory productivity degradation index obtained from the measured spatial distribution of the products-in-process;

determining the timing of updating the operation schedule further based on the calculated value of the factory productivity degradation index exceeding the threshold value of the factory productivity degradation index, the threshold value of the factory productivity degradation index corresponding to at least one of an allowable amount of a quick change in the productivity index and an allowable amount of a slow change in the productivity index; and controlling the one or more transport vehicles based on the operation schedule.

8. A non-transitory recording medium recording a transport operation control program, which when executed by a computer, cause to computer to perform a method comprising:

measuring a spatial distribution of products-in-process being transported by one or more transport vehicles;

calculating, based on the spatial distribution, an operation schedule defining a route and a frequency of a transport operation carried out by each of the one or more transport vehicles;

determining a timing of updating the operation schedule based on a change in productivity index obtained from the spatial distribution of the products-in-process;

updating, at a timing based on a change in productivity index obtained from the spatial distribution of the products-in-process being transported by one or more transport vehicles, an operation schedule defining a route and a frequency of a transport operation carried out by the one or more transport vehicles based on the spatial distribution of the products-in-process;

holding, as the productivity index, a threshold value of a factory productivity degradation index, which is representative of degradation in productivity of a factory;

calculating the factory productivity degradation index obtained from the measured spatial distribution of the products-in-process;

determining the timing of updating the operation schedule further based on the calculated value of the factory productivity degradation index exceeding the threshold value of the factory productivity degradation index, the threshold value of the factory productivity degradation index corresponding to at least one of an allowable amount of a quick change in the productivity index and an allowable amount of a slow change in the productivity index; and controlling the one or more transport vehicles based on the operation schedule.

9. The transport operation control device according to claim 1, wherein the factory productivity degradation index is calculated by referring to the spatial distribution of the products-in-process at a particular time instant or by integrating the spatial distribution of the products-in-process in a range of a particular time window which is switchable in response to a mode of operation.

10. The transport operation control device according to claim 1, wherein the at least one processor is further configured to execute the instructions to:

prepare the operation schedule by connecting high-density portions in the spatial distribution of the products-in-process.

11. The transport operation control device according to claim 1, wherein the at least one processor is further configured to execute the instructions to:

determine a height of a density of the products-in-process by at least one index selected from indexes indicating, for a quantity of the products-in-process being transported, that an absolute value at a particular time instant, or an integral value or an average value in a particular time window is greater than a predetermined value, that the quantity is greater by a predetermined or higher ratio than the average value over a whole of a measurement target region.

12. The transport operation control device according to claim 1, wherein the at least one processor is further configured to execute the instructions to:

connect those portions at which the density of the products-in-process is high so that circulation is performed in a shortest distance or in a shortest time.

13. The transport operation control device according to claim 1, wherein the at least one processor is further configured to execute the instructions to:

perform clustering, by the density, on spatial distribution of the products-in-process and to connect centroids of clusters in a shortest distance.

14. The transport operation control device according to claim 1, wherein the at least one processor is further configured to execute the instructions to:

prepare the operation schedule by selecting, as connection objects upon connection, only those portions close to each other with a predetermined or less distance therebetween in the spatial distribution of the products-in-process, so that only those transport vehicles close to each other in the spatial distribution of the products-in-process are included in the same route.

15. The transport operation control device according to claim 14, wherein the at least one processor is further configured to execute the instructions to:

prepare the operation schedule by classifying the connection objects based on density ranges.

16. The transport operation control device according to claim 1, wherein the at least one processor is further configured to execute the instructions to:

determine a circulation frequency in proportion to a magnitude of an average value or a maximum value of the density of the products-in-process in a portion as an object of circulation.

17. The transport operation control device according to claim 5, wherein the at least one processor is further configured to execute the instructions to:

recognize the vicinity of a workstation as a range reachable in a predetermined distance or in a predetermined time interval from a center portion of the workstation.

18. The transport operation control device according to claim 6, wherein the at least one processor is further configured to execute the instructions to:

evaluate the operation schedule by using, as an index, at least one of a throughput of an entire factory or a part of lines thereof, a traveling cost of the one or more transport vehicles, an operation rate of the one or more transport vehicles, and an operation rate of a manufacturing device in each workstation.

* * * * *